US010306336B2

(12) United States Patent
Doherty et al.

(10) Patent No.: US 10,306,336 B2
(45) Date of Patent: *May 28, 2019

(54) METHODS FOR SERVING A VIDEO ADVERTISEMENT TO A USER (71) Applicant: Yieldmo, Inc., New York, NY (US)

(72) Inventors: Connor Doherty, New York, NY (US); Eric Wu, River Edge, NJ (US)

(73) Assignee: Yieldmo, Inc., New York, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 16/040,512

(22) Filed: Jul. 19, 2018

(65) Prior Publication Data
US 2018/0332362 A1 Nov. 15, 2018

Related U.S. Application Data (63) Continuation of application No. 15/806,735, filed on Nov. 8, 2017, now Pat. No. 10,063,937.
(Continued)

(51) Int. Cl.
H04N 21/81 (2011.01)
H04N 21/2387 (2011.01)
(Continued)

(52) U.S. Cl.
CPC ....... H04N 21/812 (2013.01); G06Q 30/0241 (2013.01); H04N 21/2387 (2013.01); H04N 21/2668 (2013.01); H04N 21/26258 (2013.01); H04N 21/44222 (2013.01); H04N 21/4782 (2013.01); H04N 21/47217 (2013.01); H04N 21/8456 (2013.01); H04N 21/8545 (2013.01); G06F 3/0485 (2013.01)

(58) Field of Classification Search
CPC ............ H04N 21/812; H04N 21/2387; H04N 21/2668; H04N 21/47217; H04N 21/8545; H04N 21/44222; H04N 21/8456; H04N 21/4782; H04N 21/26258; G06F 3/0485; G06Q 30/0241
See application file for complete search history.

(56) References Cited

U.S. PATENT DOCUMENTS

2004/0131043 A1* 7/2004 Keller .................. G06F 3/0485
370/351
2005/0005294 A1* 1/2005 Kojo .................... H04N 5/4403
725/51

(Continued)

Primary Examiner — Oschta I Montoya
(74) Attorney, Agent, or Firm — Run8 Patent Group, LLC; Peter Miller (57) ABSTRACT One variation of a method for serving a video advertisement to a computing device includes: segmenting a digital video into a first video segment and a second video segment; at a visual element loaded into a document, loading the first video segment; in response to a scroll event that shifts the visual element into view within a window rendered on a display of the computing device, playing back the first video segment within the visual element; during playback of the first video segment, loading the second video segment from a remote server; in response to completion of playback of the first video segment, playing back the second video segment within the visual element; and calculating a level of user engagement a total duration of the digital video played back in the visual element.

20 Claims, 3 Drawing Sheets

Related U.S. Application Data (60) Provisional application No. 62/424,953, filed on Nov. 21, 2016.

(51) Int. Cl.

| | |
|---|---|
| *H04N 21/2668* | (2011.01) |
| *H04N 21/472* | (2011.01) |
| *H04N 21/8545* | (2011.01) |
| *G06Q 30/02* | (2012.01) |
| *H04N 21/442* | (2011.01) |
| *H04N 21/262* | (2011.01) |
| *H04N 21/4782* | (2011.01) |
| *H04N 21/845* | (2011.01) |
| *G06F 3/0485* | (2013.01) |

(56) References Cited

U.S. PATENT DOCUMENTS

| | | | |
|---|---|---|---|
| 2012/0272256 A1* | 10/2012 | Bedi | G06Q 30/0207 725/5 |
| 2013/0191776 A1* | 7/2013 | Harris | H04M 1/72561 715/784 |
| 2013/0198641 A1* | 8/2013 | Brownlow | G06F 3/0485 715/738 |
| 2013/0305170 A1* | 11/2013 | de Souza | G06F 3/0485 715/760 |
| 2014/0078178 A1* | 3/2014 | Li | G09G 5/00 345/659 |
| 2015/0082339 A1* | 3/2015 | Sumitomo | H04N 21/812 725/32 |
| 2016/0105698 A1* | 4/2016 | Tang | G11B 27/10 725/14 |
| 2017/0353774 A1* | 12/2017 | Makhlouf | H04N 21/812 |

\* cited by examiner

FIG. 4

# METHODS FOR SERVING A VIDEO ADVERTISEMENT TO A USER

CROSS-REFERENCE TO RELATED APPLICATIONS

This application is a continuation application of U.S. application Ser. No. 15/806,735, filed on 8 Nov. 2017, which claims the benefit of U.S. Provisional Application No. 62/424,953, filed on 21 Nov. 2016, both of which are incorporated in their entireties by this reference.

This application is related to U.S. patent application Ser. No. 15/217,879, filed on 22 Jul. 2016, which is incorporated in its entirety by this reference.

TECHNICAL FIELD

This invention relates generally to the field of mobile advertising and more specifically to a new and useful method for serving a video advertisement to a user in the field of mobile advertising.

DESCRIPTION OF THE EMBODIMENTS

The following description of embodiments of the invention is not intended to limit the invention to these embodiments but rather to enable a person skilled in the art to make and use this invention. Variations, configurations, implementations, example implementations, and examples described herein are optional and are not exclusive to the variations, configurations, implementations, example implementations, and examples they describe. The invention described herein can include any and all permutations of these variations, configurations, implementations, example implementations, and examples.

1. Method

Figure 1:
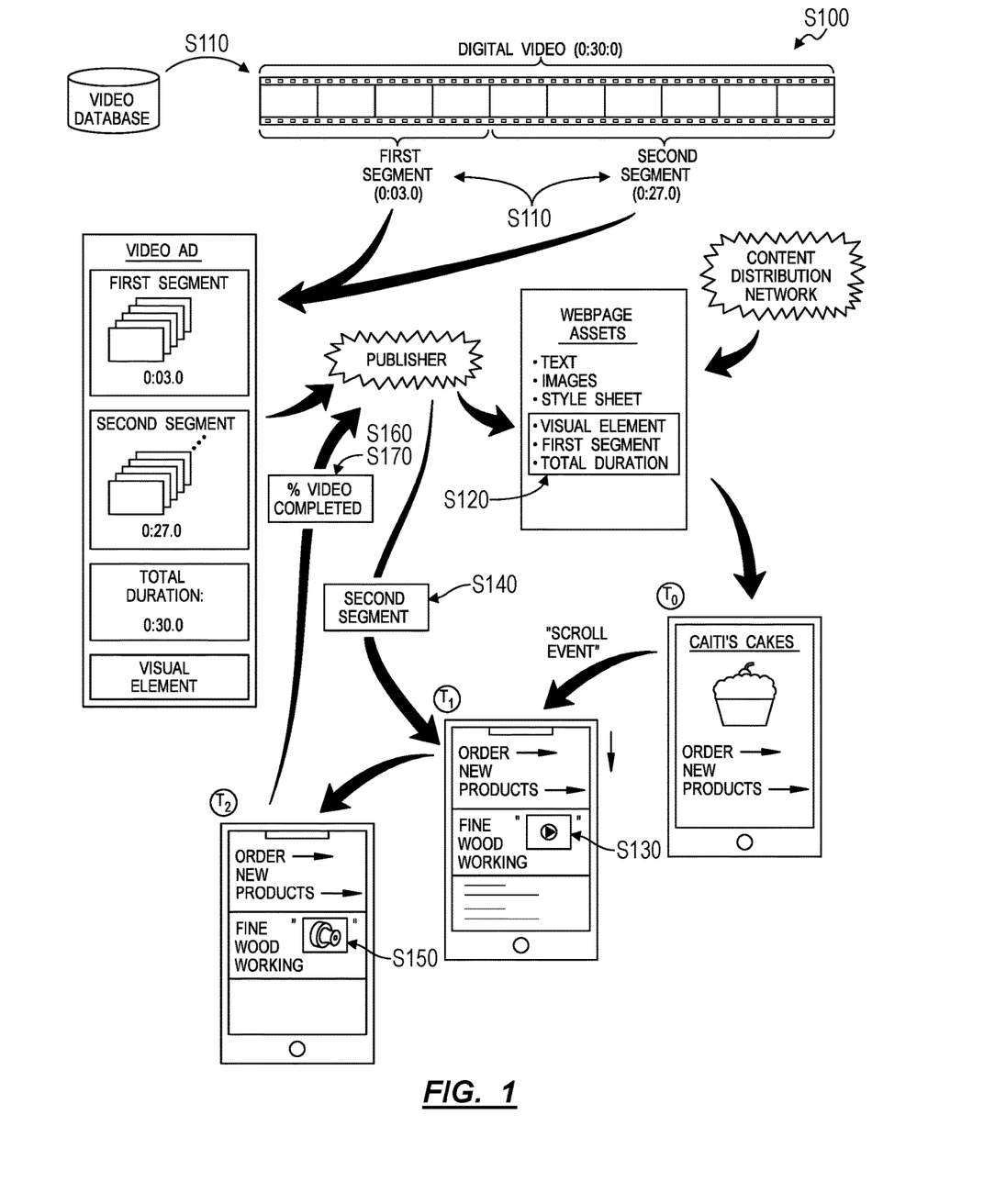
FIG. 1 is a flowchart representation of a method.
Figure 3:
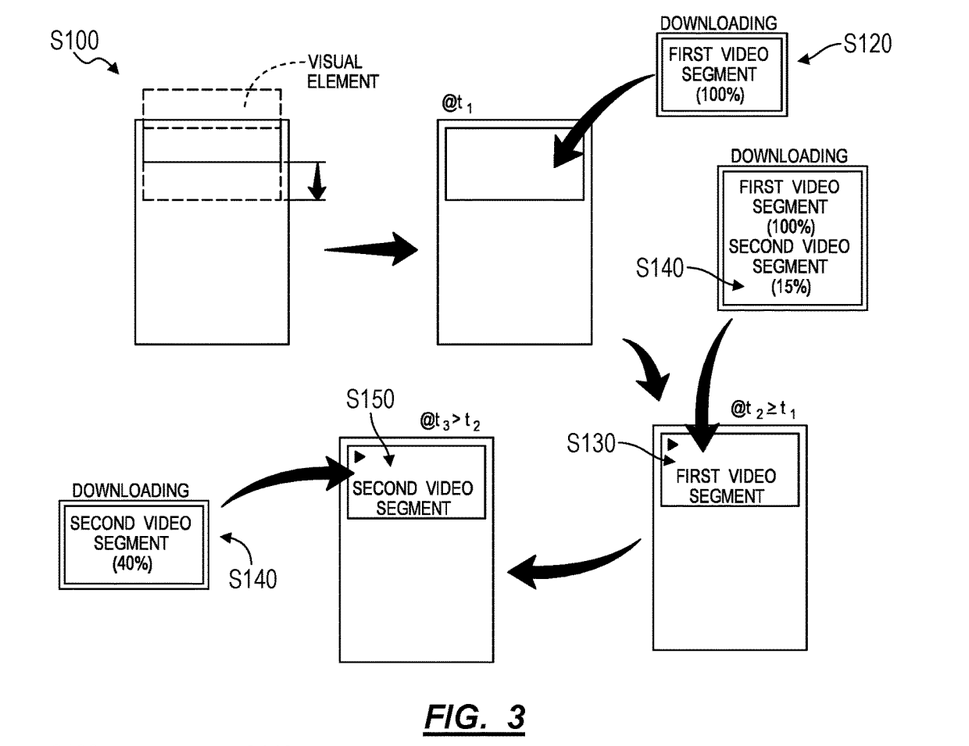
FIG. 3 is a flowchart representation of a variation of the method.

As shown in FIGS. 1 and 3, a method S100 for serving a video advertisement to a user includes: remote from the computing device, segmenting a digital video into a first video segment and a second video segment a duration of the second video segment greater than a duration of the first video segment in Block S110. The method S100 also includes, at a visual element loaded into a document viewed on the computing device, at a first time, loading the first video segment and a total duration specification for a total duration of the digital video in Block S120; in response to a scroll event that shifts the visual element into view within a window rendered on a display of the computing device, playing back the first video segment within the visual element in Block S130; during playback of the first video segment, loading the second video segment from a remote server in Block S140; in response to completion of playback of the first video segment while the visual element remains in view within the window, playing back the second video segment within the visual element in Block S150; calculating a sum of a duration of the first video segment and a duration of the second video segment replayed within the visual element in Block S160; and calculating a level of user engagement with the digital video based on a comparison of the sum and the total duration specification in Block S170.

One variation of the method S100 includes, at a visual element loaded into a document viewed on the computing device: loading a first video segment of a digital video including an initial frame of the digital video and a contiguous sequence of frames of the digital video succeeding the initial frame at a first time; accessing a total duration specification for a total duration of the digital video; in response to a scroll event that shifts the visual element into view within a window rendered on a display of the computing device, playing back the first video segment within the visual element at a first frame rate; during playback of the first video segment, loading a second video segment of the digital video from a remote server, the second video segment including a second frame of the digital video immediately succeeding a last frame of the first video segment in the digital video and including a contiguous sequence of frames of the digital video succeeding the second frame; in response to completion of playback of the first video segment while the visual element remains in view within the window, playing back the second video segment within the visual element at a second frame rate; calculating a sum of a duration of the first video segment and a duration of the second video segment replayed within the visual element; and calculating a level of user engagement with the digital video based on a comparison of the sum and the total duration specification.

2. Applications

Generally, the method S100 can be executed by an advertising (or "ad") platform or computing device: to segment a digital video into two discrete segments (or "chunks") of frames; to serve a first video segment of frames to a user's computing device for immediate loading into a webpage or native application executing on the user's computing device; to sequentially replay frames in the first video segment within a visual element when a scroll event at the computing device brings the visual element into view on a display of the computing device; to serve the second video segment of frames to the user's computing device once replay of the first video segment of frames begins for replay within the visual element upon conclusion of the first video segment of frames; and to serve a specification for a total duration of the original digital video to the visual element to enable local alignment of the first video segment and the second video segment of frames and calculation of global engagement metrics for the digital video represented by the first video segment and the second video segments of frames replayed within the visual element. Thus, the method S100 can be executed by an advertising platform to avoid downloading more video data than a user viewing the digital video advertisement may wish to view by intermittently downloading segments of the digital video sequentially while maintaining playback of segments of the digital video at a natural frame rate of the digital video (i.e., a frame rate of the digital video at a standard playback speed).

In particular, Blocks of the method S100 can be executed by an ad platform and by a visual element within or over a window rendered on a display of a computing device to reduce a file size of video ad initially downloaded to a computing device when accessing a digital document containing a pointer to this video ad—such as a webpage accessed within a web browser or a digital document accessed within a native application executing on the computing device—without sacrificing a resolution of the digital ad. When assets from a webpage or other virtual document including a pointer to the video ad are downloaded to a user's computing device, the total file size of these assets may be relatively large compared to the download bandwidth or download speed of a local network through which this content is served to the computing device. The computer system may therefore require an extended period of time, such as several seconds, to download and render this content within a web browser or within a native application. To reduce total data transfer to the computing device and a total amount of time necessary to download these data, the ad platform can execute Blocks of the method S100 to section the video ad into: a short first video segment (e.g., a three-second video segment) containing frames from the beginning of the video ad; and a longer second video segment (e.g., a twelve-second or twenty-seven-second video segment) containing frames from the remainder of the video ad. The ad platform can then serve the first video segment with a visual element in which the first video segment is replayed to the computer system when the document is first downloaded, thereby reducing the total amount of data transfer to the computing device by approximately the size of the second video segment of the video ad.

Because a user manipulating the computing device may not have navigated to the webpage or other document to view the video ad specifically, the user may scroll past the visual element without stopping; lack of immediate access to the second video segment of the video may therefore be immaterial to the user's experience with the video ad. Thus, the visual element can load the first video segment exclusive of the second video segment when the document is initially accessed at the computing device and can delay downloading the second video segment until playback of the first video segment begins (e.g., until the visual element comes into view on the display of the computing device following a scroll event), thereby reducing a total data volume downloaded to the computing device to view an initial instance of the document. The visual element can also avoid downloading the second segment of the digital video altogether if playback of the first segment is not initiated at the computing device, thereby limiting total data downloaded to the computing device to access the document. However, if the user scrolls down to the visual element, the visual element can play back the first video segment while also initiating download of frames in the second video segment; upon completion of the first video segment, the computer system can transition to playback of the second video segment, thereby providing the user with a substantially seamless viewing of the complete video ad and consuming additional data usage at the user's computing device only when the user's actions (e.g., scrolling to the visual element or selecting the visual element) suggest an interest in viewing such advertising content.

The method S100 is described below as a method for generating and serving a digital video representing a video ad in two discrete segments, including both: a first video segment that loads into a webpage substantially in real-time once a web browser navigates to this webpage and that replays once the video ad is scrolled into view within a window on a display of a computing device; and a second video segment that loads into the webpage asynchronously once the first video segment has been viewed and while the video ad remains in view within the window. However, the method S100 can be similarly implemented to serve segments of a digital video to a document accessed by any other native application executing on a user's computing device, such as a smartphone, smartwatch, tablet, laptop computer, or desktop computer, etc.

3. Ad Serving

Block S110 of the method S100 can be executed by an ad platform hosted on a remote computer system, such as a remote server. The ad platform can: retrieve a digital video (e.g., a digital advertising video) from an internal or external database (e.g., a server or local file storage), such as over the Internet; and segment the digital video into a first video segment of a first duration (e.g., three seconds) and a segment of a longer duration (e.g., 27 seconds) automatically or under the guidance of a human representative of an advertiser. The ad platform can then: store the second video segment of the digital video in a database; package the first video segment of the digital video into a visual element that can later be inserted inline within a document (e.g., a webpage or mobile application) and selectively call frames from the second video segment of the digital video; and can make the visual element and the second video segment of the digital video (hereinafter the "video ad") available for download by the advertiser. The ad platform can additionally or alternatively upload the visual element and second video segment to an ad exchange, to a publisher ad server, to an advertising agency ad server, and/or to another content distribution network.

Later, when a user navigates to a publisher's webpage via a web browser or to a mobile application via a native application (hereinafter an "app") executing on her smartphone, tablet, or other computing device, a web server hosted by the publisher can return content or pointers to content for the webpage (e.g., in Hypertext Markup Language, or "HTML", or a compiled instance of a code language native to a mobile operating system), including formatting for this content and a publisher ad tag that points the web browser or app to the publisher's ad server (e.g., a network of external cloud servers). The ad server can then implement an ad selector to select a particular ad to serve to the web browser or app and either: return the selected ad directly to the web browser or app; or return a second ad tag that redirects the browser or app to an advertiser or publisher ad server. In the latter case, the advertiser or publisher ad server can return a third ad tag that redirects the web browser or app to a content delivery network, which may include a network of cloud servers storing raw creative graphics for the ad, and the content delivery network can return the selected ad to the web browser.

In the foregoing implementation, if the ad server selects the video ad, the ad server or content delivery network, etc. can return the visual element in the form of content within an HTML iframe element to the web browser (or in the form of content within a view on the mobile application) which can then place the iframe element within the webpage (or within the window of the app). The visual element can then initiate replay of the first video segment of the digital video once the visual element is shifted into view on a display of the user's computing device and recall frames from the second video segment of the digital video once replay of the first video segment is complete or near complete while the visual element remains in view on the display according to various Blocks of the method S100.

4. Digital Video

Block S110 of the method S100 recites, remote from the computing device, segmenting a digital video into a first video segment and a second video segment a duration of the second video segment greater than a duration of the first video segment. Generally, in Block S110, the ad platform accesses a digital video file—such as from a local machine or local network or pulled from a remote server or remote database—for subsequent extraction of frames.

In one implementation, the ad platform hosts an advertiser portal through which a human representative of an advertiser can upload or select video advertising content for transformation into a video ad. For example, an advertiser can access an instance of the advertiser portal through a native application or through a web browser executing on a desktop computer, a laptop computer, a smartphone, or a tablet and then: upload a video ad stored in local memory on the computing device; navigate to a video ad stored at an external data storage service; or enter a URL for a video ad published online through the advertiser portal. In this example, the ad platform can retrieve or otherwise access a digital video, such as in MP3, MP4, MOV, or AVI formats, and load this digital video into a remote server in Block S110.

The ad platform can thus retrieve a digital video from an internal or external database, such as over the Internet, wherein the digital video: includes visual (and audio) content; spans a particular duration of time, such as five seconds, 30 seconds, or one minute; and is characterized by a particular (or natural) frame rate, such as 24 frames per second, and a maximum file size, such as one megabyte. The ad platform can then serve the digital video and metadata of the digital video, such as a total duration specification for a total duration of the video ad, the natural frame rate of the video ad, a file size of the video ad, etc., to a visual element rendered within (or over) a window rendered on a display of a computing device, as described below.

However, the ad platform can implement any other method or technique to access a digital video of any other size, format, or frame rate, etc.

5. Video Segmentation

Block S110 of the method S100 also recites segmenting a digital video into a first video segment and a second video segment a duration of the second video segment greater than a duration of the first video segment. Generally, in Block S110, the ad platform splits or otherwise divides the digital video into discrete segments (e.g., including a short first video segment and a longer second video segment).

In one implementation, the ad platform selects a series of frames—from the beginning of the digital video—that together approximate a preset target file size, such as 200 kilobytes, and compiles these ordered frames into the first video segment. In another implementation, the ad platform selects a preset number of frames—such as 75 frames—from the beginning of the digital video and compiles these frames in order into the first video segment. In yet another implementation, the ad platform selects a series of frames—from the beginning of the digital video—that together span a target duration of time, such as three seconds, and compiles these frames in order into the first video segment. In another implementation, the ad platform selects a series of frames—from the beginning of the digital video—that together span a target portion, such as 10%, of the total duration of the digital video and compiles these frames in order into the first video segment. The ad platform then compiles the remaining frames in the digital video—in order—into the second video segment.

For example, the ad platform can generate the first video segment by selecting a sequential subset of frames of the digital video starting at a first frame of the digital video and defining a contiguous sequence of frames succeeding the first frame. The first video segment, when played back at the natural frame rate of the digital video, can define a duration of video playback corresponding to a predefined percentage (e.g., fifteen percent) of the total duration of the digital video. Thus, the first video segment can include frames (e.g., every frame) within the first fifteen percent of the total duration of the digital video. In this example, the ad platform can also generate the second video segment by selecting a second sequential subset of frames of the digital video starting at a frame immediately succeeding a last frame of the first video segment—thereby defining a seamless transition between the first video segment and the second video segments during playback at the visual element. The ad platform can compile a remaining percentage (e.g., eighty-five percent) of the total duration of the digital video into the second video segment.

In another example, the ad platform can generate the first video segment and the second video segment based on a percentage of a total file size of the digital video. For example, the ad platform can access a predefined maximum file size specification for a maximum permitted total file size of the segments of the digital video (e.g., 1 MB); generate the first video segment that forms a first percentage (e.g., ten percent) of the total file size of the digital video and generate the second video segment that forms a second percentage (e.g., sixty percent) of the total file size of the digital video and including a contiguous sequence of frames succeeding a last frame of the first video segment.

In another example, the ad platform transforms a 30-second digital video into: a first video segment spanning the first three seconds of the digital video; a second video segment spanning the last 27 seconds of the digital video; and a time specification of thirty seconds (or "0:30.0") in Blocks S120 and S122. Thus, to replay the digital video, the visual element can replay the first video segment from its beginning in Block S130 and then replay the second video segment from its beginning in Block S150 upon conclusion of the first video.

In another example, the ad platform transforms a 30-second digital video into: a first video segment spanning the first three seconds of the digital video; a second video segment spanning the full 30 seconds of the digital video; a first time specification of three seconds (or "0:03.0") for the first video segment; and a second time specification of thirty seconds (or "0:30.0") for the complete digital video in Blocks S110 and S122. Thus, to replay the digital video in Blocks S130 and S150: the visual element can replay the first video segment from its beginning; upon conclusion of the first video, the visual element can replay the second video segment starting with a frame at or near (e.g., immediately succeeding) a 0:03.0 marker in the second video segment, per the first time specification of three seconds, in order to align replay of the first video segment and the second video segments and limit replay of duplicate frames.

However, the ad platform can divide the video ad into the first video segment and the second video segments according to any other schedule.

Furthermore, the ad platform can then generate a quantitative representation of the combination of the first video segment and the second video segments with a total duration specification equivalent to the original length of the digital video.

6. Loading a Video Advertisement

Block S120 of the method S100 recites at a visual element loaded into a document viewed on the computing device, at a first time, loading the first video segment and a total duration specification for a total duration of the digital video. Generally, in Block S120, a visual element rendered within a window display on a computing device, such as a smartphone, a laptop computer, or other mobile computing device, can download the first video segment of the digital video, and the total duration specification for the original digital video. The computing device can imbed the visual element into a document (e.g., a webpage) accessed by a web browser or other native application executing on a local computing device, such as a smartphone, tablet, or smartwatch.

As described above, when a user navigates to a publisher's webpage via a web browser executing on her smartphone, tablet, or other computing device, a web server hosted by the publisher can return content or pointers to content for the webpage (e.g., in Hypertext Markup Language, or "HTML"), including formatting for this content and a publisher ad tag that points the web browser to the publisher's ad server (e.g., a network of external cloud servers). The ad server can then implement an ad selector to select an instance of the video ad to serve back to the webpage based on the ad tag.

The publisher's ad server can then return an instance of the visual element (e.g., in the form of an HTML iframe), the first video segment of the digital video (e.g., in the form of content within the HTML iframe), and the total duration specification for the original digital video (e.g., in the form of a quantitative value) directly to the web browser (or to the publisher's native application) executing on the user's computing device. Alternatively, the publisher's ad server can return a second ad tag that redirects the browser (or mobile application) to a marketing ad server; the marketing ad server can return a third ad tag that redirects the web browser to a content delivery network; and the content delivery network can return the visual element and the first video segment of the digital video to the web browser (or to the native application). The publisher can thus return the visual element, the first video segment, and the total duration specification for the original digital video to the webpage for insertion into a webpage accessed by a web browser executing on a user's computing device.

In addition to the visual element and the first video segment of the digital video, the publisher and/or other content delivery network can further serve other content to the web browser, such as textual content, other visual media (e.g., digital images), other advertisements, style sheets, and/or other assets. Due to a data size of this content relative to current download bandwidth limitations, the user's computing device may download this content over a period of time, such as over a period of several seconds. The user's computing device can thus cooperate with the publisher and/or other content delivery network to download the visual element and the first video segment of the digital video—which is relatively short in length and small in file size compared to the full digital video—in order to limit total data size of files initially downloaded to load the webpage, thereby limiting a total time needed to download sufficient content to render a useable, media-rich version of the webpage within the web browser.

Furthermore, upon receipt of the visual element, the web browser can insert the (empty) visual element below the top of the webpage such that all (or at least a substantial portion of) the visual element falls outside of a section of the webpage initially rendered on the display of the computing device. In particular, because the visual element is configured to initiate replay of the digital video—beginning with a first frame in the first video segment of the digital video—once a scroll event at the computing device brings all (or at least a threshold portion) of the visual element into a window rendered on a display of the device, the publisher can insert the visual element into a region of the webpage outside of a section of the webpage initially rendered on the display, thereby delaying replay of the digital video until the user scrolls down the webpage to the visual element and delaying download of frames in the second video segment of the video until (well) after the remainder of the webpage has been downloaded from the publisher and/or content delivery network. For example, the publisher can insert the video ad into the webpage with sufficient offset from the top of the webpage—such as at least a full height of the window between the top of the webpage and the top edge of the video ad—to obscure the visual element when the webpage is initially rendered on the display of the user's computing device and to enable the user to then scroll down to bring the visual element into view on the display. Alternatively, the ad selector can confirm that the position of the ad tag within the webpage meets these requirements before serving the video ad to the web browser, and the web browser can insert the visual element into the webpage at the location defined by the ad tag.

Similarly, upon receipt of the first video segment of the digital video, the web browser can load this first video segment of the digital video into the visual element. For example, once the visual element is downloaded and inserted into the webpage, the user's computing device can commence or continue downloading the first video segment of the digital video into the visual element and store frames from the first video segment in a local "buffer."

The visual element can also resize frames in the first video segment—at a locked aspect ratio—to achieve a greatest fill area for visual content loaded into the visual element without skewing this content. For example, the visual element can: pull its current width and height (e.g., in number of pixels) from the webpage or from the web browser; resize frames in the first video segment to fill the greatest area of the current instantiation of the visual element; and store this resizing specification for frames in the first video segment for later application to frames in the second video segment once replay of frames in the first video segment has been replayed in the visual element. The visual element can thus apply resizing specifications for the first video segment to frames in the second video segment in order to seamlessly transition from the first video segment to the second video segment during replay of the digital video. The visual element can also repeat this process and rewrite the resizing specification in response to a change in the format of the webpage rendered within the web browser, such as if the user changes a zoom level within the web browser or changes an orientation of the computing device, such as from portrait to landscape mode; the visual element can also implement these methods and techniques in real-time during replay of frames in the second video segment.

7. Replaying the First Video Segment

Block S130 of the method S100 recites, in response to a scroll event that shifts the visual element into view within a window rendered on a display of the computing device, playing back the first video segment within the visual element. Generally, in Block S130, the visual element functions to begin playback of the first video segment in response to a scroll event that brings the visual element into view within the window rendered on the display of the device.

In one implementation, the visual element initiates playback of the first video segment when at least a minimum area or minimum height (e.g., 75%) of the visual element is contained within the window and no scroll event is currently active at the computing device. In particular, in this implementation, the visual element can begin playback of the first video segment if a completed (i.e., terminated) scroll event at the computing device brings all or a threshold portion of the visual element into view within the window. Alternatively, the visual element can begin playback of the first video segment once the visual element comes into view on the display, regardless of the state of a last or current scroll event at the computing device. However, the visual element can initiate playback of the first video segment in response to any other event, such as selection by a user, or state at the computing device.

The visual element can also set internal controls based on a value of the total duration specification received with the first video segment. For example, the visual element can confirm that the first video segment is incomplete and then request frames of a remaining section of the original video (e.g., from the publisher or content distribution network) once playback of the first video segment is initiated responsive to a difference between the length of the first video segment and the total duration specification. Once the visual element begins download of frames in the second video segment in Block S140, the visual element can also align frames in the second video segment to frames in the first video segment according to the total duration specification in order to achieve a substantially seamless transition from the first video segment to the second video segment in Block S150. Furthermore, the visual element can compile user interactions during replay of the first video segment and user interactions during replay of the second video segment to calculate global engagement metrics for the digital video in Block S170, as described below, based on the total duration specification received in Block S120.

8. Loading the Second Video Segment

Block S140 of the method S100 recites, during playback of the first video segment, loading the second video segment from a remote server. Generally, the visual element can implement Block S150 to download the second video segment from the advertising platform following commencement of playback of the first video segment.

In one implementation, in Block S140, the visual element queries the publisher, content distribution network, or ad platform, etc. for frames (e.g., a portion of all of the frames) in the second video segment once playback of the first video segment commences in Block S130. The visual element can then store received frames in local memory, such as in a rolling buffer, prior to rendering these frames at a correct time. Alternatively, the visual element can request frames in the second video segment: once a threshold proportion or number of frames in the first video segment have been replayed; or once only a threshold proportion or number of frames in the first video segment remain.

However, the visual element can query the remote server for the second video segment in response to any other event and can download the second video segment according to any other schedule.

9. Playback of Second Video Segment

Block S150 of the method S100 recites, in response to completion of playback of the first video segment while the visual element remains in view within the window, playing back the second video segment within the visual element. Generally, in response to completion of playback of the first video segment, the visual element can render frames in the second video segment in sequence within the visual element.

For example, for the first video segment and the second video segments that represent non-overlapping segments of the digital video, the visual element can initiate playback of the second video segment once playback of the first video segment is completed. Alternatively, for the first video segment that represents a first video segment of the digital video and for the second video segment that represents the entire digital video, the visual element can initiate playback of the second video segment at a frame offset from the beginning of the second video segment by the duration of the first video segment once playback of the first video segment is completed in order. In particular, in this implementation, the visual element can align playback of the second video segment to the first video segment by initialing playback of the second video segment at a frame immediately succeeding a last frame in the first video segment according to a frame sequence represented in the original digital video. For example, the visual element can: play back a last frame of the first video segment at a first time; and then, at a second time succeeding the first time by a duration corresponding to a time between adjacent frames in the digital video dictated by the natural frame rate, play back the second video segment at the natural frame rate. Thus, the visual element can transition between the first video segment and the second video segment at the natural frame rate of the digital video.

As shown in FIG. 3, once the first video segment is fully downloaded to the computing device and into the visual element, the visual element can additionally or alternatively buffer a portion of the second video segment from the remote server. In response to completion of playback of the first video segment but prior to completion of loading the second video segment, the visual element can play back the portion of the second video segment within the visual element. Thus, the visual element can completely download the first video segment prior to play back of the first video segment yet buffer the second video segment during playback of the second video segment.

9.1 Closed-loop Replay of Second Video Segment

During playback of the video, the visual element can implement closed-loop control to load a next frame of the second video segment, as shown in FIG. 7. In one implementation, the visual element records a first duration of time from submission of a call for a first frame in the second video segment to display of the first frame within the window rendered on the display of the computing device (hereinafter a first "response time") and then identifies a next frame in the video ad to render based on this first duration. For example, if the first response time is less than a time allocated to each frame of the digital video (hereinafter a frame offset time), the visual element can request and render a second frame immediately following the first frame in the second video segment. However, if the first response time is more than a time allocated to each frame of the digital video (hereinafter a frame offset time), the visual element can add the time step value to a timestamp value for a next frame called by the virtual element. In particular, if the first response time is less than a difference between timestamps of two adjacent frames in the digital video (e.g., 42 milliseconds for the digital video replayed at twenty-four frame-per-second) (hereinafter a "frame offset time"), the visual element can skip the second frame in the second video segment and instead request a nearest subsequent frame that is offset in time from the first frame by more than the response time.

Generally, after rendering a first frame in the second video segment, the visual element can call local memory, a local buffer, or the remote content distribution network for a second frame immediately succeeding the first frame and then display this second frame accordingly. However, if the first response time is greater than the frame offset time, the visual element can call local memory, the local buffer, or the remote content distribution network for a next frame offset from the first frame by a period of time nearest—but not less than—the first response time. In particular, the visual element can submit a request for a second frame succeeding the first frame and assigned a second timestamp offset from a first timestamp assigned to the first frame by a time nearest—and not less than—the first duration. The visual element can then display this second frame—in replacement of the first frame—immediately or at a time corresponding to the original time offset between the first frame and this next frame. The visual element can then record a second response time from submission of a call for the second frame to display of the second frame within the window. If the second duration is less than the frame offset time for the second video segment, the visual element can call local memory, the local buffer, or the remote content distribution network for a third frame immediately succeeding the second frame and then display the third frame accordingly. However, if the second duration is greater than the frame offset time for the second video segment, the visual element can instead call a third frame offset from the second frame by a period of time nearest the second response time and then display this third frame immediately or at a time corresponding to the original time offset between the second frame and this third frame.

Furthermore, in the foregoing implementation, the visual element can call a next frame from local memory, the local buffer, or the remote content distribution network at a time preceding a target render time for the next frame by a measured response time of a preceding frame. The visual element can thus implement a measured response time from when a frame is called to when the frame is rendered on the display of the device to set a trigger time to call a subsequent frame—prior to a target render time for the subsequent frame—in order to ensure that the next frame is received and rendered within the visual element at or near the target render time. Specifically, the visual element can feed a measured response time of one frame of the second video segment forward to set a time to call a next frame in the second video segment such that the next frame is received in time to render the next frame within the visual element at a target render time (e.g., at a time offset from a preceding frame by the static frame offset time).

Therefore, the visual element can implement these methods and techniques to maintain a global frame rate of the second video segment during playback within the visual element (and/or within a video player or popup window, as described below) even during instances in which limited bandwidth slows download of frames to the computing device, such as if slow download speed at the computing device yields extended times for a network to return frames called by the visual element that exceed a static frame offset time for adjacent frames in the second video segment.

The visual element can additionally or alternatively query a graphics-processing unit (or "GPU") within the computer system for its current load. The visual element can then vary an effective frame rate for playback of the video—within the visual element when the visual element is in view within the window and replaying the second video segment—based on the current load of the GPU. For example, the visual element can query the GPU for its current load at a frequency corresponding to the original frame rate of the video. In this example, if the GPU returns a load value above a threshold value (e.g., 75%, 98%) once a first frame in the video is loaded into the visual element, the visual element can preserve the first frame of the second video segment in the visual element, bypass a second frame immediately succeeding the first frame in the second video segment, and index a flag to a third frame immediately succeeding the second frame in the second video segment. In this example, the visual element can again query the GPU for its current load in preparation to load the third frame; if the GPU returns a load value below the threshold value, the visual element can load the third frame at a time succeeding the time the first frame was loaded by twice the inverse of the original frame rate of the video. However, if the GPU again returns a load value above the threshold value, the visual element can preserve the first frame of the video in the visual element, bypass the third frame, and index the flag to a fourth frame in the video immediately succeeding the third frame. The visual element can repeat this process while the visual element remains within the window on the display of the computing device and until the second video segment is completed.

The visual element can thus implement proportional closed-loop control during playback of the second video segment within the visual element in order to minimize or eliminate "choppy" playback and other playback inconsistencies. In particular, by selecting a subsequent frame in the video ad to display in the visual element based on a measured response time to display a preceding frame in the second video segment and by preemptively calling the next frame at a time preceding its targeted display time by the measured response time, the visual element can preserve a global speed of the video ad—though a local frame rate during playback may be less than the original frame rate of the digital video—and can ensure that a current or nearly-current frame from the video ad is displayed at any given time during playback even during instances in which the GPU within the computing device is overloaded or otherwise slowed to the point that the graphics card is unable to display frames within the visual element at the original frame rate of the video ad.

In the foregoing implementation, the visual element can additionally or alternatively implement integral and/or derivative closed-loop controls or any other suitable type of closed-loop control. The visual element can also maintain a clock or other record of a start time at which a first frame is displayed during playback of the video ad. The visual element can also continuously align a query for and subsequent rendering of a next frame in the second video segment to a time since the first frame was rendered based on the original frame rate of the digital video, thereby reducing or eliminating drift over time such that the global playback speed of the digital video—at the visual element—substantially matches the original playback speed of the digital video.

For example, a remote computer system can bundle (e.g., store in metadata) a frame rate—such as a natural frame rate—for play back of each video segment in the digital video. The visual element can then implement the natural frame rate to playback the first video segment and the second video segment. The visual element can transmit a first query to the computing device to render a first frame in the second video segment in the visual element; record a lag time from a time of submission of the first query to a time of render of the first frame in the visual element. In response to the lag time exceeding a time between adjacent frames in the digital video dictated by the natural frame rate: the visual element can skip playback of a second frame in the second video segment immediately succeeding the first frame; and transmit a second query to the computing device to load third frame in the second video segment succeeding the second frame and offset from the first frame by the lag time. Generally, in response to a slow connection between the computing device and the remote server, the visual element can selectively skip playback of intermediate frames. The visual element can also dynamically modify a frame rate of frames rendered within the visual element to match the number of frames in the first video segment and the second video segment and the connection speed between the computing device and the remote server to provide—to a user viewing the visual element—the appearance that the that the digital video is played back at the natural frame rate.

(The visual element can also query the computing device to render a first frame in the first video segment in the visual element; and record a lag time from a time of submission of the query to a time of render of the first frame in the visual element. In response to the lag time exceeding a time between adjacent frames in the digital video dictated by the natural frame rate: the computer system can skip a second frame—immediately succeeding the first frame—in the first video segment; and load a third frame in the first video segment succeeding the second frame and offset from the first frame by the lag time.)

However, the visual element can implement any other methods and techniques during video playback to select frames (e.g., in the first video segment and the second video segments) that meet GPU's current processing limitations and to skip other frames in order to preserve a global frame rate of the video ad during playback.

10. Playback Termination

The visual element can cease playback of frames in the first video segment and the second video segments when a scroll event moves the visual element out of the window rendered on the display. The visual element can also resume playback of the first or second video segment from a last rendered frame when a later scroll event brings the visual element back into view within the window.

As described above, the visual element can initiate download of frames in the second video segment once a scroll event first brings the visual element into view within the window. Once download of the second video segment is begun, the visual element can complete download of the second video segment regardless of whether the first and/or second video segments are fully replayed. Alternatively, the visual element can cease download of the second video segment once the visual element is shifted out of the window and then resume download of the remaining frames in the second video segment once the visual element is brought back into view within the window by a subsequent scroll event.

Figure 4:
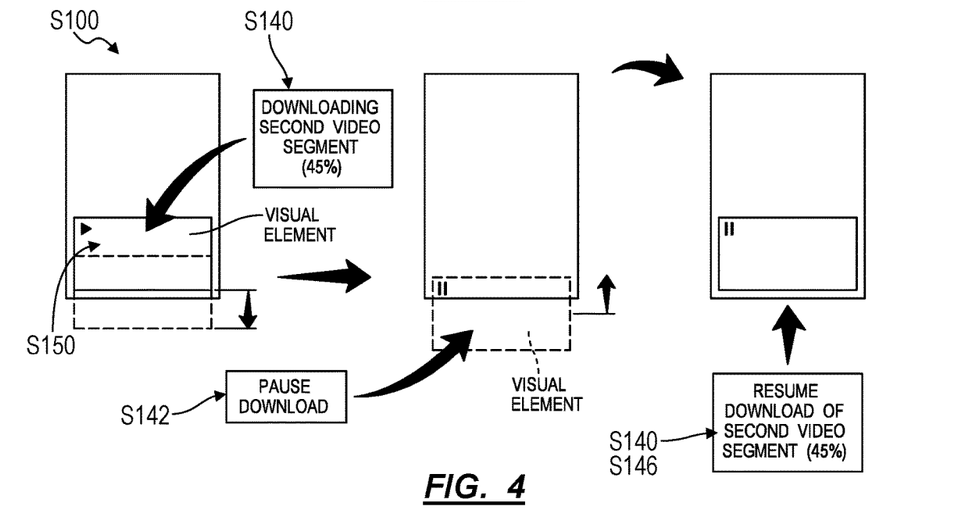
FIG. 4 is a flowchart representation of a variation of the method.

In one variation shown in FIG. 4, in response to detecting a first scroll event that moves the visual element out of view of the window (e.g., toward and out of a bottom of the window), the visual element can pause download of frames in the second video segment in Block S142 and can pause playback of frames in the second video segment if playback of the second video segment has commenced in Block S146. Thus, the visual element can terminate download and replay of video segments in the visual element when the visual element is out of view of the window. In response to a second scroll event that moves the visual element back into view within the window, the visual element can resume download of subsequent (or remaining) frames of the second video segment. In response to termination of the second scroll-event, the visual element can resume playback of frames of the second video segment sequentially from a last frame rendered within the visual element. Thus, the visual element can avoid downloading and playing back frames in the visual element when the visual element is out of view of the window.

10.2 Pre-loading a Third Segment

In another variation, the visual element can load the first video segment and a third video segment—defining an end portion of the digital video—prior to playback of the first video segment and prior to loading the second video segment in Block S180. Generally, in this variation, the visual element can pre-load both a beginning and an ending of the digital video such that, when connection between the remote server and the computing device is interrupted or lost during download of the second video segment, the visual element retains access to the end of the digital video and can finalize a message to the user through playback of this third video segment even if intermediate content is inaccessible. In particular, the visual element can render an ending video segment to ensure that content rendered within the visual element completes a motif or overarching message of the (entirety of the) digital video even in the event of slow or lost connection between the remote server and the computing device or other glitch that prevent access to intermediate content of the digital video.

Figure 2:
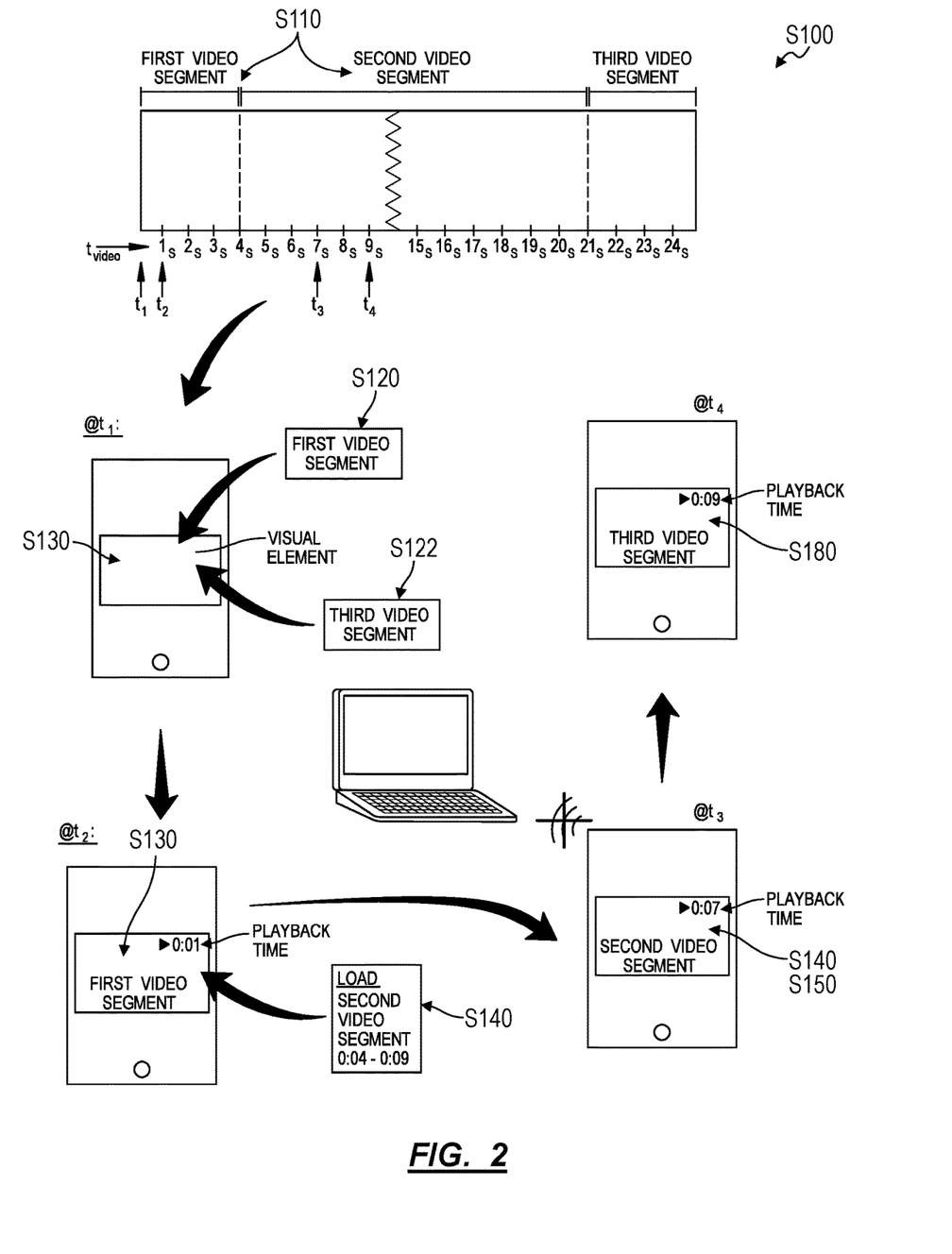
FIG. 2 is a flowchart representation of a variation of the method.

In this variation, the visual element can load the first video segment and a third video segment at a first time prior to playback of the first video segment and prior to loading the second video segment in Block S122 as shown in FIG. 2. In this variation, the third video segment can include a third subset of frames of the digital video succeeding the second subset of frames in the digital video or can include a static hero image representing advertising content of the digital video. The visual element can then store the third video segment locally for future use. Furthermore, the visual element can download metadata of the digital video from the remote server including filenames of the first video segment, the second video segment, and the third video segment and an order for playback of the first video segment, the second video segment, and the third video segment. Generally, in response to completion of playback of the second video segment, the visual element can play back the third video segment within the visual element. However, in response to detecting loss of connection between the computing device and the remote server and preceding completion of playback of the second video segment, the visual element can play back the third video segment within the visual element.

For example, the visual element can access a video advertisement for a film that includes an intro segment including a title of the film, an intermediate (e.g., plot development) segment including a few clips of the film, and an ending segment including end credits for the film, a release date for the film, and where the film may be shown. In response to a scroll event that moves the visual element into view within the window, the visual element can commence download of the intro segment and the ending segment. Upon selection of the visual element within the window, the visual element can play back the intro segment and commence download of the intermediate segment. In response to completion of playback of the intro segment, the visual element can play back frames of the intermediate segment. However, prior to completion of download of the intermediate segment and during playback of the intermediate segment, connection between the computing device and the remote server may be interrupted. Then the visual element can transition to playback of the ending segment, which summarizes the video advertisement prior to completion of playback of the intermediate segment. Thus, the visual element can ensure a user viewing the visual element views an end of the video advertisement despite loss of connection or poor bandwidth during download of the intermediate (longer) video segment.

11. Other Interactions

One variation of the method S100 includes, in response to selection of the visual element within the window: requesting a separate digital video containing frames spanning the first video segment and the second video segments; opening a video player outside of the visual element; and triggering replay of the complete digital video within the video player. Generally, in this variation, the visual element can trigger the computing device to transition to replaying frames in the digital video within an external video player in response to input from the user.

In this variation, if the user selects an area within the visual element during playback of the first video segment (i.e., before playback of the second video segment begins), the visual element can: request—from the publisher, content distribution network, or ad platform, etc.—a separate digital video file containing frames spanning the last (or next) frame in the first video segment rendered within the visual element to the last frame in the second video segment; trigger the computing device to open a native video player; and then serve frames in the separate digital video file to the native video player for playback. In this implementation, the visual element can also discard the first video segment and the second video segments and instead serve frames from the separate, more complete digital video file during the remainder of the webpage session. For example, once the native video player is closed, the visual element can render frames from the separate digital video file (i.e., rather than from the first or second video segments), such as beginning with a last (or next) frame rendered in the native video player before the native video player was closed.

In another implementation, if the user selects an area within the visual element during playback of the second video segment (i.e., after completion of the first video segment), the visual element can: trigger the computing device to open the native video player; and serve frames from the second video segment to the native video player for playback, beginning with the last (or next) frame of the second video segment rendered within the visual element.

For example, in response to selection of the visual element, the computing device can render a native video player over the window on the display of the computing device. In response to completion of loading of the first video segment, the native video player can play back the first video segment within the native video player; and load the second video segment from the remote server to the native video player. In response to completion of playback of the first video segment in the native video player, the native video player can play back the second video segment within the native video player.

In yet another implementation, if the user selects an area within the visual element at any time during the webpage session or after complete replay of the second video segment, the visual element can: request a complete digital video file containing frames spanning the first frame in the first video segment to the last frame in the second video segment; trigger the computing device to open the native video player; and serve frames in the complete digital video file to the native video player for playback from the beginning of the digital video. As described above, in this implementation, the visual element can discard the first video segment and the second video segments and instead render frames from the complete digital video file, such as by rendering frames from the digital video file—rather than from the first or second video segments—once the native video player is closed.

During playback, the visual element can also toggle output of a first audio track aligned to the first video segment and a second audio track aligned to the second video segment in response to selection of the visual element. In this implementation, the visual element can implement methods and techniques as described above to maintain global alignment of the first and second audio tracks during playback of the first video segment and the second video segments. However, the visual element (and/or the webpage or native application) can respond to selection of the visual element in any other way.

Furthermore, if the video ad is completed (i.e., viewed in full) through the visual element or through a video player, the visual element can display a blank frame or end frame for the remainder of the duration that the visual element is rendered within the window on the display of the user's computing device. However, upon selection of the visual element by the user, the visual element can also restart replay of the first video segment from the first frame and repeat methods and techniques described above to replay the first video segment and the second video segments. Alternatively, upon selection of the visual element by the user, the visual element can request the complete digital video file, as described above, and replay the complete digital video file rather than the first video segment and the second video segments. However, the visual element can reset the visual element in any other way and in response to any other input or interaction into the computing device.

12. Metrics

Blocks S160 and S170 of the method S100 recite calculating a sum of a duration of the first video segment and a duration of the second video segment replayed within the visual element in Block S160; and calculating a level of user engagement with the digital video based on a comparison of the sum and the total duration specification in Block S170. Generally, in Blocks S160 and S170, the visual element (or the ad platform, etc.) can generate an engagement metric representing a level of the user's engagement with the visual element based on durations of the first video segment and the second video segments replayed in the visual element and the total duration specification. In particular, though the first video segment and the second video segments represent separate, discrete videos, the visual element can track engagement with each of the first video segment and the second video segments separately and then combine these metrics according to the total duration specification to calculate an engagement metric for the original digital video as a whole.

In one implementation, the visual element: tracks a first duration of time spanned by frames in the first video segment replayed during the current website session; tracks a second duration of time spanned by frames in the second video segment replayed during the current website session; sums the first and second durations; and divides the sum of the first and second durations by the total duration specification to calculate a percentage of the original digital video replayed by the visual element (and viewed by the user) before navigation to an alternate webpage or closure of the web browser. The visual element can associate the user's engagement with the visual element as in one of a 25%, 50%, 75%, or 100% quartile according to the percentage of the original digital video replayed by the visual element. If the user selects the visual element to trigger replay of the digital video through a native video player, the visual element can implement similar methods and techniques to calculate a percentage of the digital video replayed separately through the native video player and/or a total percentage of the digital video replayed through the visual element and the native video player in aggregate.

For example, the visual element can render all of the first video segment—approximately ten percent of the total duration of the video ad—and approximately fifteen percent of the second video segment prior to a scroll event that moves the visual element out of view of the window. A particular user viewing the visual element may have viewed twenty-five percent of the total duration of the video ad. Thus, the visual element can calculate a "50%" quartile engagement level for the particular user.

The visual element can also track: a duration of time that the visual element is shown within the window during the current webpage session; a number of times the visual element enters and exits the window; a maximum duration that the visual element is continuously shown within the window; and/or incidence of a click-through event, such as whether the user selected the visual element to navigate to a destination URL stored in visual element metadata or to open a native video player to view the digital video in a larger format (and with an accompanying audio track).

Additionally or alternatively, the visual element can: generate an interaction record representing a number, speed, and/or direction of scroll events that shift the visual element into and out of the window at the computing device. The visual element can then classify a level of user engagement in the visual element based on the interaction record and serve the interaction record and the user engagement level to a remote interaction server. In one example, the visual element can generate an interaction record representing speed of scroll events shifting the visual element across the window at the computing device. In this example, a first user may slowly scroll a first instance of the visual element across the display of her mobile computing device; and a second user may quickly scroll a second instance of the visual element across the display of his mobile computing device. In this example, the visual element can classify the engagement level of the first user as higher than the engagement level of the second user in the same video content. In another example, the first user may scroll a first instance of the visual element embedded in a first webpage upward from a bottom of the window in a first scroll event. A second user may scroll a second instance of the visual element embedded in a second webpage downward from a top of the window in a second scroll event. In this example, the visual element can classify the engagement level of the second user as higher than the engagement level of the first user because a downward direction of the second scroll event indicates the second user viewed advertising content in the first instance of the visual element disparately from content of the second webpage, wherein a user may scroll content in an upward (i.e., bottom to top) direction to view succeeding webpage content.

The visual element can then package any one or more of the user engagement metrics in Block S170 and return these user metric data to the publisher, advertiser, or other entity. Alternatively, the visual element can return raw interaction data (e.g., a number of frames in the first video segment and the second video segments replayed in the visual element) to the ad platform, and the ad platform can transform these raw interaction data into one or more user engagement metrics in Block S170, such as based on the total duration specification, before serving these engagement metrics to one or more external entities. However, the visual element and/or the ad platform can generate and handle user engagement metrics of any other type in any other suitable way.

The visual element can then serve the level of user engagement to a remote interaction server (e.g., the ad platform). For example, the visual element can serve the level of user engagement to the remote interaction server in response to a selection event that closes the window, a selection event that pauses playback of the second video segment, a selection event that pauses playback of the first video segment, a click-through event (e.g., navigating to an external webpage related to the digital video), a scroll event that shifts the visual element out of view of the window, completion of playback of the digital video (e.g., the first video segment and the second video segment), etc.

Blocks of the method S100 described above can be executed by a visual element within a webpage accessed through a web browser, within a mobile or native application, or within any document of any other type accessed via any other application executing on a computing device, such as a smartphone, a smartwatch, a tablet computer, a laptop computer, or a desktop computer, or other computing device.

The systems and methods described herein can be embodied and/or implemented at least in part as a machine configured to receive a computer-readable medium storing computer-readable instructions. The instructions can be executed by computer-executable components integrated with the application, applet, host, server, network, website, communication service, communication interface, hardware/firmware/software elements of a user computer or mobile device, wristband, smartphone, or any suitable combination thereof. Other systems and methods of the embodiment can be embodied and/or implemented at least in part as a machine configured to receive a computer-readable medium storing computer-readable instructions. The instructions can be executed by computer-executable components integrated by computer-executable components integrated with apparatuses and networks of the type described above. The computer-readable medium can be stored on any suitable computer readable media such as RAMs, ROMs, flash memory, EEPROMs, optical devices (CD or DVD), hard drives, floppy drives, or any suitable device. The computer-executable component can be a processor but any suitable dedicated hardware device can (alternatively or additionally) execute the instructions.

As a person skilled in the art will recognize from the previous detailed description and from the figures and claims, modifications and changes can be made to the embodiments of the invention without departing from the scope of this invention as defined in the following claims.

The invention claimed is:

1. A method comprising:
    at a visual element loaded into a document viewed on a computing device:
        at a first time, loading a first video segment of a digital video from a remote server into the visual element;
        in response to a scroll event that shifts the visual element into view within a window rendered on a display of the computing device, playing back the first video segment within the visual element;
        during playback of the first video segment, loading a second video segment of the digital video from the remote server into the visual element; and
        in response to completion of playback of the first video segment while the visual element remains in view within the window, playing back the second video segment within the visual element; and
    calculating a level of user engagement with the digital video based on playback of the first video segment and the second video segment in the visual element.

2. The method of claim 1:
    wherein playing back the first video segment within the visual element comprises, following completion of loading the first video segment to the computing device, playing back the first video segment within the visual element;

wherein loading the second video segment from the remote server comprises, following completion of loading the first video segment to the computing device, buffering a portion of the second video segment from the remote server; and wherein playing back the second video segment within the visual element comprises, in response to completion of playback of the first video segment and prior to completion of loading the second video segment, playing back the portion of the second video segment within the visual element.

3. The method of claim 1:

wherein loading the first video segment comprises accessing a natural frame rate of the digital video;

wherein playing back the first video segment within the visual element comprises, at a second time, playing back a last frame of the first video segment; and wherein playing back the second video segment within the visual element comprises, at a third time succeeding the second time by a duration corresponding to a time between adjacent frames in the digital video dictated by the natural frame rate, playing back the second video segment at the natural frame rate.

4. The method of claim 1:

wherein loading the second video segment from a remote server comprises, in response to the visual element remaining in view within the window, initiating sequential download of frames in the second video segment; and further comprising, during download of the second video segment, in response to detecting a second scroll event that moves the visual element out of view of the window, pausing download of frames in the second video segment.

5. The method of claim 4, further comprising:

in response to a third scroll event that moves the visual element back into view within the window, resuming download of subsequent frames of the second segment;

in response to termination of the third scroll-event:

playing back frames of the second segment sequentially from a last frame rendered within the visual element; and during playback of the second segment, loading frames of a third segment in the digital video, a first frame in the third segment succeeding a last frame in the second segment.

6. The method of claim 4:

further comprising, generating an interaction record representing a set of scroll events shifting the visual element into and out of the window at the computing device; and wherein calculating the level of user engagement further comprises classifying the level of user engagement in the visual element based on the interaction record.

7. The method of claim 6:

wherein generating the interaction record further comprises recording speeds and directions of the set of scroll events at the document while the visual element is in view within the window; and wherein calculating the level of user engagement further comprises classifying the level of user engagement in the visual element further based on the speeds and the directions of the set of scroll events.

8. The method of claim 1, further comprising, at a remote server:

generating the first video segment comprising a predefined percentage of the total duration of the digital video and comprising a first frame of the digital video and a contiguous sequence of frames succeeding the first frame; and generating the second video segment comprising a remaining percentage of the total duration of the digital video and a contiguous sequence of frames succeeding a last frame of the first video segment.

9. The method of claim 1, further comprising, at a remote server:

accessing a maximum file size specification for a total file size of the digital video;

generating the first video segment comprising a first percentage of the total file size of the digital video and comprising a first frame of the digital video and a contiguous sequence of frames succeeding the first frame; and generating the second video segment comprising a second percentage of the total file size of the digital video and a contiguous sequence of frames succeeding a last frame of the first video segment.

10. The method of claim 1:

further comprising accessing a natural frame rate of the digital video; and wherein playing back the first video segment within the visual element comprises:

transmitting a first query to the computing device to render a first frame in the first video segment in the visual element;

recording a lag time from a time of submission of the first query to a time of render of the first frame in the visual element; and in response to the lag time exceeding a time between adjacent frames in the digital video dictated by the natural frame rate:

skipping a second frame in the first video segment; and transmitting a second query to the computing device to load the third frame in the first video segment succeeding the second frame and offset from the first frame by the lag time.

11. The method of claim 1, further comprising, in response to selection of the visual element:

rendering a native video player over the window on the display of the computing device;

in response to completion of loading of the first video segment:

playing back the first video segment within the native video player; and loading the second video segment from the remote server to the native video player; and in response to completion of playback of the first video segment in the native video player, playing back the second video segment within the native video player.

12. The method of claim 1, further comprising, at the first time at the visual element:

loading a third video segment of the digital video succeeding the second video segment of the digital video; and loading metadata of the digital video from the remote server comprising filenames of the first video segment, the second video segment, and the third video segment and an order for playback of the first video segment, the second video segment, and the third video segment; and in response to completion of playback of the second video segment, playing back the third video segment within the visual element.

13. The method of claim 12, wherein loading the third video segment comprises loading the third video segment comprising a static hero image representing advertising content of the digital video.

14. A method comprising:
at a visual element loaded into a document viewed on the computing device:
at a first time, loading a first video segment of a digital video and a total duration specification for a total duration of the digital video;
at a second time, succeeding the first time, playing back the first video segment within the visual element;
during playback of the first video segment, loading a second video segment of the digital video; and
in response to completion of playback of the first video segment and the state at the computing device, playing back the second video segment within the visual element;
calculating a sum of a duration of the first video segment and a duration of the second video segment replayed within the visual element; and
calculating a level of user engagement with the digital video based on a comparison of the sum and the total duration specification.

15. The method of claim 14, wherein playing back the first video segment comprises playing back the first video segment in response to an event at the second time that shifts the visual element into view within a window rendered on a display of the computing device.

16. The method of claim 14, wherein playing back the first video segment comprises playing back the first video segment in response to the event comprising a vertical scroll event in the document.

17. The method of claim 14, wherein playing back the first video segment comprises playing back the first video segment in response to an event at the second time comprising a selection of the visual element in the document.

18. A method comprising, at a visual element loaded into a document viewed on the computing device:
at a first time, loading a first video segment of a digital video;
in response to a scroll event that shifts the visual element into view within a window rendered on a display of the computing device, playing back the first video segment within the visual element;
during playback of the first video segment, loading a second video segment of the digital video;
in response to completion of playback of the first video segment while the visual element remains in view within the window, playing back the second video segment within the visual element;
generating an interaction record of the visual element comprising a duration of the first video segment and a duration of the second video segment replayed within the visual element; and
serving the interaction record of the visual element to a first remote server for calculation of a level of user engagement.

19. The method of claim 18, further comprising, at a second remote server, segmenting the digital video into the first video segment and the second video segment the duration of the second video segment greater than the duration of the first video segment.

20. The method of claim 19, wherein segmenting the digital video comprises:
generating the first video segment comprising a predefined percentage of the total duration of the digital video and comprising a first frame of the digital video and a contiguous sequence of frames succeeding the first frame; and
generating the second video segment comprising a remaining percentage of the total duration of the digital video and a contiguous sequence of frames succeeding a last frame of the first video segment.

* * * * *